United States Patent
Astigarraga et al.

(10) Patent No.: US 9,652,350 B2
(45) Date of Patent: May 16, 2017

(54) EVALUATION OF COMPLEX SAN ENVIRONMENTS

(71) Applicant: INTERNATIONAL BUSINESS MACHINES CORPORATION, Armonk, NY (US)

(72) Inventors: Tara Astigarraga, Fairport, NY (US); Louie A. Dickens, Tucson, AZ (US); Ian A. MacQuarrie, San Jose, CA (US); Jose R. Mosqueda Mejia, Michoacan (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 14/603,123

(22) Filed: Jan. 22, 2015

(65) Prior Publication Data
US 2016/0217020 A1    Jul. 28, 2016

(51) Int. Cl.
G06F 11/00    (2006.01)
G06F 11/30    (2006.01)
G06F 11/07    (2006.01)

(52) U.S. Cl.
CPC ........ *G06F 11/3034* (2013.01); *G06F 11/008* (2013.01); *G06F 11/0727* (2013.01); *G06F 11/0793* (2013.01)

(58) Field of Classification Search
USPC .......................................................... 714/41
See application file for complete search history.

(56) References Cited

U.S. PATENT DOCUMENTS

| | | | | |
|---|---|---|---|---|
| 7,185,232 B1* | 2/2007 | Leavy | ................ | H04L 12/2697 714/32 |
| 7,620,851 B1* | 11/2009 | Leavy | ................ | H04L 12/2697 714/4.1 |
| 7,757,215 B1* | 7/2010 | Zhou | .................... | G06F 11/3644 714/2 |
| 8,095,983 B2* | 1/2012 | Guruswamy | ......... | G06F 21/577 709/224 |
| 8,707,104 B1* | 4/2014 | Jean | .................... | G06F 11/1048 714/41 |

(Continued)

FOREIGN PATENT DOCUMENTS

CN    102288978 A    12/2011
CN    103235841 A    8/2013

(Continued)

OTHER PUBLICATIONS

Luo et al., "Design and Implementation of an Efficient Multipath for a SAN Environment" pp. 101-110, ISPA Workshops 2005, LNCS 3759, 2005.

(Continued)

*Primary Examiner* — Amine Riad
(74) *Attorney, Agent, or Firm* — Griffiths & Seaton PLLC

(57) ABSTRACT

A method for evaluating error recovery effectiveness in a complex Storage Area Network (SAN) by a processor device is provided. At least one baseline performance metric is recorded. A predetermined error is injected into at least one component of the SAN associated with the recorded baseline performance metric. An elapsed time is recorded from the injection of the error to the return to the recorded baseline performance metric.

21 Claims, 4 Drawing Sheets

(56) References Cited

U.S. PATENT DOCUMENTS

| | | | |
|---|---|---|---|
| 9,003,238 B2* | 4/2015 | Floeder | G06F 11/3672 703/21 |
| 2005/0169185 A1* | 8/2005 | Qiu | H04L 41/145 370/241 |
| 2005/0169186 A1* | 8/2005 | Qiu | H04L 41/0631 370/242 |
| 2005/0204028 A1* | 9/2005 | Bahl | H04L 41/145 709/223 |
| 2006/0282737 A1 | 12/2006 | Shi et al. | |
| 2007/0083792 A1* | 4/2007 | McDermott | G06F 11/0742 714/20 |
| 2007/0271082 A1* | 11/2007 | Dominguez | G06F 11/261 703/20 |
| 2008/0163205 A1* | 7/2008 | Bennett | G06F 9/45558 718/1 |
| 2009/0088998 A1 | 4/2009 | Pierce | |
| 2009/0138772 A1* | 5/2009 | Bertacco | G06F 11/2236 714/733 |
| 2009/0167336 A1 | 7/2009 | La Rosa et al. | |
| 2009/0313411 A1* | 12/2009 | Stenfort | G06F 11/1004 710/306 |
| 2010/0058107 A1 | 3/2010 | Blaauw et al. | |
| 2010/0083203 A1* | 4/2010 | Bose | G06F 17/5036 716/113 |
| 2011/0055649 A1* | 3/2011 | Koushanfar | G06F 21/577 714/729 |
| 2013/0096902 A1* | 4/2013 | Bose | G01R 31/318357 703/14 |
| 2014/0013178 A1 | 1/2014 | Flautner et al. | |
| 2014/0259173 A1* | 9/2014 | Parcel | G06F 21/577 726/25 |
| 2015/0033305 A1* | 1/2015 | Shear | G06F 21/45 726/6 |

FOREIGN PATENT DOCUMENTS

| | | |
|---|---|---|
| GB | 2498875 A | 7/2013 |
| WO | 2008117980 A1 | 10/2008 |

OTHER PUBLICATIONS

Astigarraga et al., "Sick But Not Dead Failures—Adaptive Testing, Evaluation and Design Methodologies" pp. 324-334, International Journal on Advances in Systems and Measurements, vol. 6, No. 3 & 4, 2013, http://www.iariajournals.org/systems_and_measurements/.

* cited by examiner

EVALUATION OF COMPLEX SAN ENVIRONMENTS

BACKGROUND OF THE INVENTION

Field of the Invention

The present invention relates in general computing systems, and more particularly to, various embodiments for test and evaluation of an effectiveness of error recovery based on return to base performance measurements in complex computer networks.

Description of the Related Art

Today with modern technology, large volumes of data are storable on disk drives; these drives can exist as a solo entity, or as part of a broader make up within a larger storage environment, for example as part of a Storage Area Network (SAN). As the sheer volume of data in today's information-based society continues to increase, so too does the demands placed on communications and data processing infrastructures that serve to manipulate, transfer, and otherwise handle this data.

SUMMARY OF THE INVENTION

Complex SAN configurations enable large numbers of computing components such as servers to access common storage via interconnection switches and cabling. The availability, integrity and recovery of these interconnections is critical to the reliable operations of the systems. Networks are often implemented with redundant routes, in conjunction with server multipath drivers allowing for failing commands to be recovered down alternate paths and avoiding outages and individual path failures.

Most all impacts relating to SAN issues (i.e., congestion, dropped frames, etc.) currently are occurring as a result of the performance degradation associated with the error recovery on the failing side of the fabric. In other words, these issues are not caused by permanent Input/Output (I/O) errors. For years, however, measurement of the success or failure of error recovery test cases has been defined by so-called "permanent I/O error."

Verifying that various error scenarios (i.e., a particular command, or a particular I/O exchange) were recovered from, and did not result in, a permanent I/O error is no longer sufficient to accurately gauge the health of modern evolving complex SAN configurations. In today's high-speed environments, any time needed to fully recover, and the associated impact on other I/O (often times non-related I/O) is essential. As server consolidation and virtualization trends continue, the impacts of non-permanent I/O errors will continue to plague environments, contributing to potentially severe performance impacts, until changes are made to the testing, development and measurement of recovery.

In view of the above, and to address the challenges previously mentioned, various embodiments for evaluating error recovery effectiveness in a complex Storage Area Network (SAN) are provided. In one such embodiment, a method for evaluating error recovery effectiveness in a complex Storage Area Network (SAN) by a processor device is provided. At least one baseline performance metric is recorded. A predetermined error is injected into at least one component of the SAN associated with the recorded baseline performance metric. An elapsed time is recorded from the injection of the error to the return to the recorded baseline performance metric.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, complex SAN configurations enable large numbers of computing components such as servers to access common storage via interconnection switches and cabling. The availability, integrity and recovery of these interconnections is critical to the reliable operations of the systems. Networks are often implemented with redundant routes, in conjunction with server multipath drivers allowing for failing commands to be recovered down alternate paths and avoiding outages and individual path failures.

Most all impacts relating to SAN issues (i.e., congestion, dropped frames, etc.) currently are occurring as a result of the performance degradation associated with the error recovery on the failing side of the fabric. In other words, these issues are not caused by permanent Input/Output (I/O) errors. For years, however, measurement of the success or failure of error recovery test cases has been defined by so-called "permanent I/O error."

Verifying that various error scenarios (i.e., a particular command, or a particular I/O exchange) were recovered from, and did not result in, a permanent I/O error is no longer sufficient to accurately gauge the health of modern evolving complex SAN configurations. In today's high-speed environments, any time needed to fully recover, and the associated impact on other I/O (often times non-related I/O) is essential. As server consolidation and virtualization trends continue, the impacts of non-permanent I/O errors will continue to plague environments, contributing to potentially severe performance impacts, until changes are made to the testing, development and measurement of recovery.

In view of the foregoing, the mechanisms of the illustrated embodiments provide various solutions to the previous challenges for testing and evaluation of complex SAN networks to determine accurate error recovery effectiveness in a modern context. These mechanisms include such functionality as recording baseline performance metrics as will be further described, injecting predetermined error into the network (for example into network components or between selected components), and recording elapsed time from the injection of the error to a determination that the system has returned to the aforementioned baseline performance metric.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios.

Figure 1:
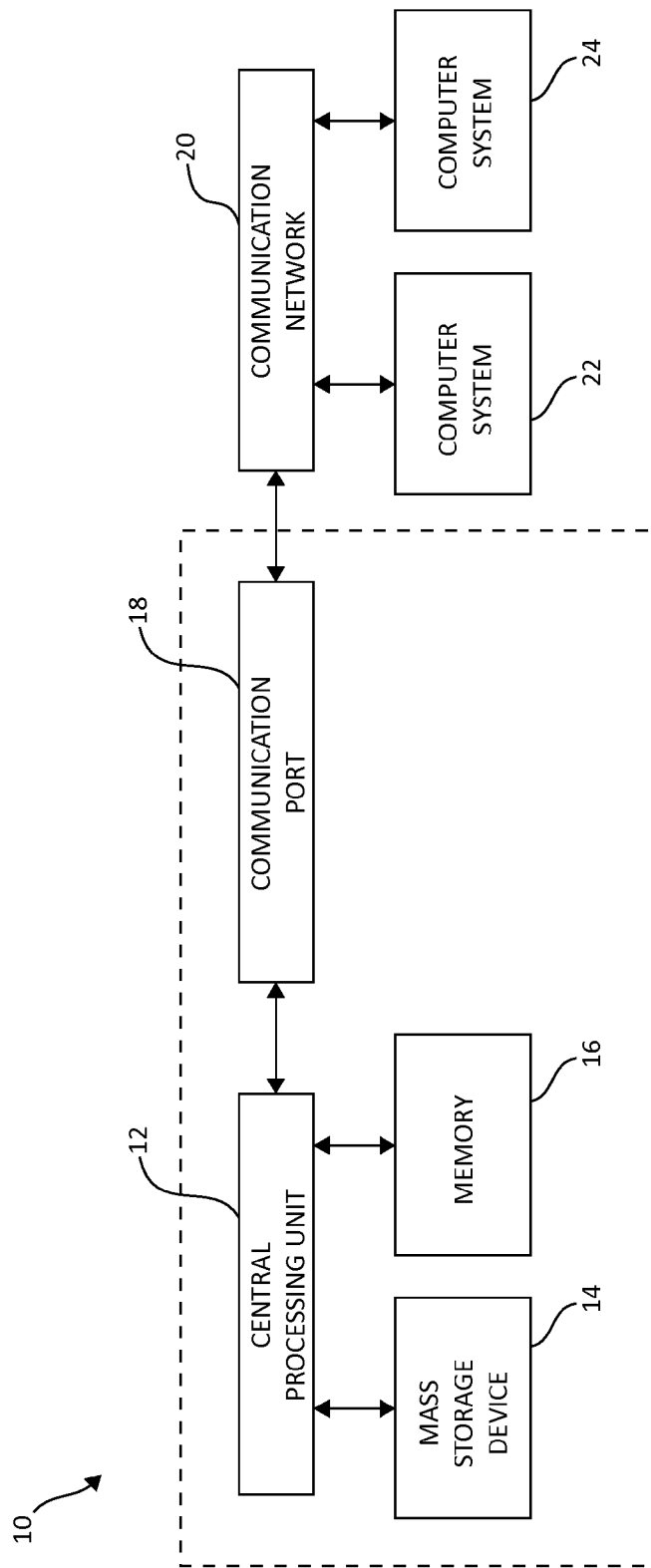
FIG. 1 is a block diagram showing an exemplary hardware structure for effecting management of multipath I/O, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The communication port 18, communication network 20, and other components not pictured for the sake of brevity but known to the skilled artisan may include such hardware components as fibre channel cabling, fibre channel ports, Host-Bus Adapters (HBAs), Converged Network Adapters (CNAs), network switches and switching components, and similar communications mechanisms known to one of ordinary skill in the art. Various aspects of the illustrated embodiments may be realized using one or more of these components as will be further described.

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
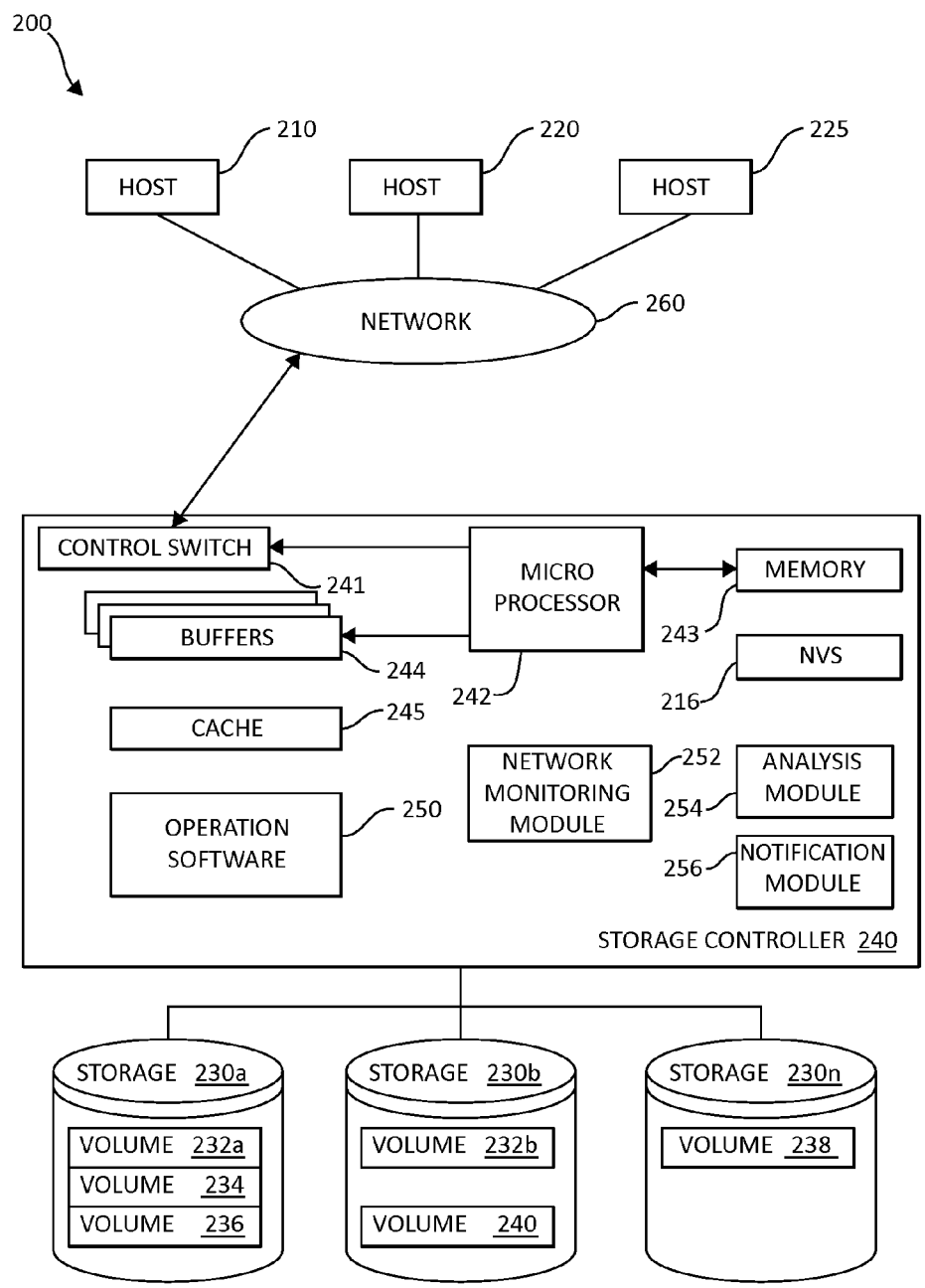
FIG. 2 is an additional block diagram of an additional exemplary hardware structure, specifically portions of a complex SAN, again in which aspects of the present invention may be realized.

FIG. 2 is an exemplary block diagram 200 showing a hardware structure of a data storage and management system (specifically, portions of a SAN 200) that may be used in the overall context of performing multipath I/O management in accordance with the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes and other network components known to one of ordinary skill in the art.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260. While one data connection between components (such as between storage 230 and storage controller 240, and network connection 260 and cluster hosts 210, 220, and 225) is shown for purposes of brevity, one of ordinary skill in the art will appreciate that a number of network connections, or "paths" may be found in a particular system or scenario in which data is transferred. These paths form the multipath architecture of storage networks in which the mechanisms of the present invention are concerned, among other aspects. In addition, alternate network paths appreciated by one of ordinary skill in the art may be found.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230*a*, 230*b* and 230*n* are shown as ranks in data storage system 200, and are referred to herein as rank 230*a*, 230*b* and 230*n*. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include operation software 250, a network monitoring module 242, an analysis module 254, and a notification module 256. The operation software 250, network monitoring module 242, analysis module 254, and notification module 256 may work in conjunction with each and every component of the storage controller 240, the hosts 210, 220, 225, and storage devices 230. The operation software 250, network monitoring module 242, analysis module 254, and notification module 256 may be structurally one complete module or may be associated and/or included with other individual modules. The operation software 250, network monitoring module 242, analysis module 254, and notification module 256 may also be located in the cache 245 or other components of portion 200.

The operation software 250, network monitoring module 242, analysis module 254, and notification module 256 may individually and/or collectively perform various aspects of the present invention as will be further described. For example, the operation software 250 may contain executable code for performing network test and evaluation functionality. The network monitoring module 252 may implement one or more monitoring processes. The network monitoring module 252 may monitor individual SAN components and/or data transmission between SAN components. For example, network monitoring module 252 may monitor data exchanges across particular data communication paths. The analysis module 254 may inject error into the SAN, and analyze the activity across such data exchanges for comparison against pre-established baseline metrics for the data activity as will be further described. Finally, the notification module 256 may send notification messages to other components in the portion 200 or elsewhere about various findings or multipath management actions taken.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, and other components in the storage controller 240. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In view of the exemplary hardware structures depicted in FIGS. 1 and 2 previously, the mechanisms of the present invention may, as one of ordinary skill in the art will appreciate, be implemented and/or utilized in a wide variety of physical locations including, but not limited to Host-Bus Adapters (HBAs), Converged Network Adapters (CNAs), switch ports, storage ports, and the like.

The mechanisms of the illustrated embodiments, among other functionality, implement new methodologies to rest recovery and return to baseline performance in complex SAN environments. The advantages of these methodologies include, among others, a quality focus on a component and set of components ability to recover from non-permanent errors. These errors include such examples as transient errors, sick but not dead errors, and dropped frames. As a result, a much deeper understanding is ascertained as to how the SAN environment reacts to particular non-permanent errors. This additional information may then be used, for example, to implement higher quality network products with an ability to more quickly return to pre-error performance rates.

Figure 3:
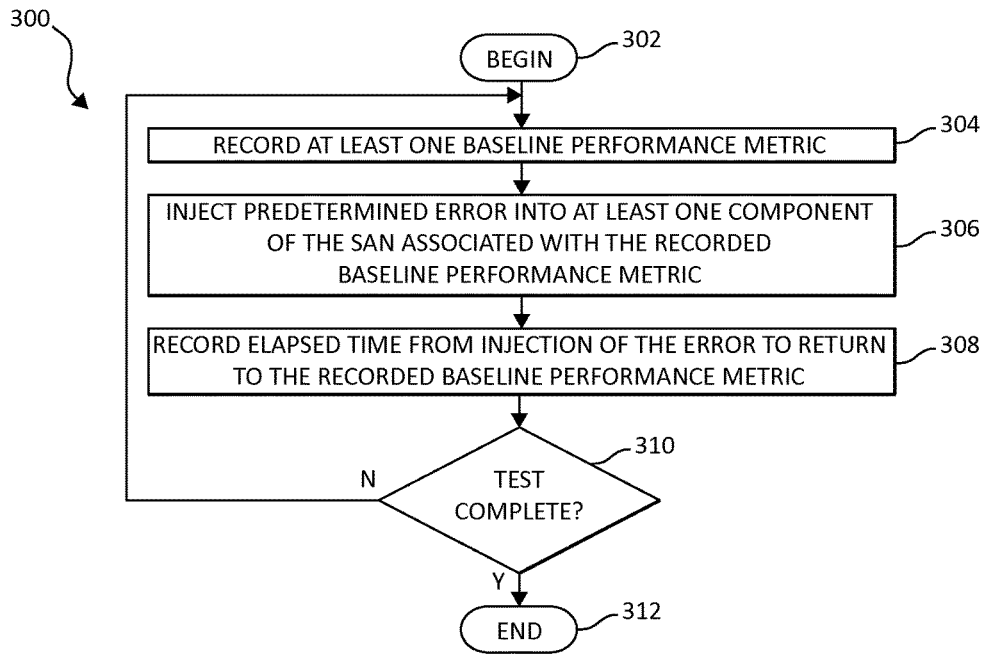
FIG. 3 is a flow chart diagram of an exemplary method for evaluating error recovery effectiveness in a complex SAN, here again in which aspects of the present invention may be implemented.

Turning now to FIG. 3, following, a flow chart diagram of an exemplary method 300 for evaluation and test of non-permanent error recovery in complex SAN environments is depicted. Method 300 begins (step 302) with the recordation of at least one baseline performance metric (step 304). As one of ordinary skill in the art will appreciate, recording baseline network performance measurements may vary according to a particular implementation. For example, a wide variety of data exchange characteristics may be wished to be evaluated, such as bandwidth, data transfer rates, numbers of frames dropped, and the like. The user and/or system may determine appropriate baseline values for particular network components, network paths, and other network aspects. In one embodiment, the baseline values may be determined from monitoring the regular performance of the network over time to determine average and deviations from standard values.

Once one or more baseline measurements have been obtained, one or more predetermined errors (or a predetermined amount of error) maybe injected into the SAN system (step 306). The error may be introduced into network components, over portions of network components, through network paths, and other various aspects of the SAN network, here again as one of ordinary skill in the art will appreciate. The errors may be of a specified quantity, quality, or other specifications that are predetermined such that the SAN component under test will react in a negative way (i.e., away from the baseline performance metric) once the error is introduced.

Once the baseline metrics are in place and the error has been injected, the system may then be monitored over time (step 308). For example, various I/O traffic may be monitored that is associated with the SAN component under evaluation, or the SAN path(s) under evaluation, to determine how the SAN components (and overall network) responds to the error. As one of ordinary skill in the art will appreciate, over time, and as a result of the errors being non-permanent in nature, the network components (and hence, the overall network), will return to the pre-error state.

The functionality depicted in method 300 may be repeated. In other words, to perform testing in the complex SAN that reflects a real world problem, error may be injected again into the specified component, or, in alternative embodiments, error may be injected in other portions of the complex SAN. In this manner, errors that propagate throughout the network, as one of ordinary skill will appreciate, may be studied and analyzed by the mechanisms of the illustrated embodiments. For example, the injected error may cause other (perhaps known or unknown) disturbances that propagate in a ripple distribution through the complex network. By repeating and/or analyzing various portions of the complex SAN, the ripple distribution effects of various errors on the complex network may be better understood.

Returning to FIG. 3, if the testing, however the testing is structured (i.e., repeating, targeted, etc.) is complete (step 310), the method then ends (step 312).

An object of the mechanisms of the illustrated embodiments is one or more determinations as to the behavior of the network components under evaluation as these components return to the former benchmark measurement. This behavior may then be recorded and analyzed to determine how best to respond. For example, a particular network switch may need to be replaced or upgraded, or particular software may need to be installed on a network component. Overall, the analyzed behavior may be used, for example, to design and implement better complex SAN networks.

Figure 4A:
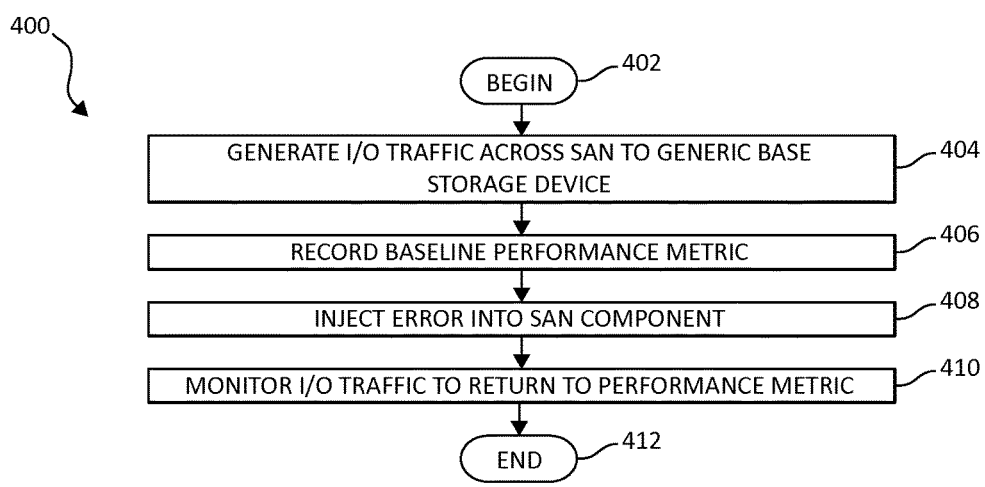
FIG. 4A is an additional flow chart diagram of an additional exemplary method for evaluating error recovery effectiveness in a complex SAN, again in which aspects of the present invention may be implemented.

The functionality described by FIG. 3 may be implemented in various embodiments, following. For example, FIG. 4A illustrates exemplary host qualification evaluation functionality according to the mechanisms of the present invention as method 400. In a host qualification methodology, a traffic generator may run I/O across a stable/monitored SAN to a generic base storage device, where baseline performance measurements are recorded, error is injected (e.g., test case n), and a timer is commenced as the error is injected and stopped when the baseline performance number is again reached.

Method 400 begins (step 402). I/O traffic is generated across the SAN to a generic base storage device (step 404). One or more baseline performance metrics are recorded (step 406). Predetermined error is then injected into the SAN (step 408). I/O traffic is again monitored over time as the SAN returns to the baseline performance metric (step 410) and various behavior of the SAN is analyzed. The method 400 then ends (step 412).

In a variation of method 400, the evaluation and test methodologies may, as the behavior of the I/O traffic is monitored over time, closely analyze the I/O traffic to ensure that the SAN has returned to a stable state before the elapsed time for the recovery is determined. The stable state determination may be reached using a variety of mechanisms. For example, the I/O traffic may be monitored until the baseline performance metric is exceeded for a predetermined amount of time, or exceeded in quantity a predetermined number of times.

In another embodiment, a storage qualification methodology may be implemented, using again, for example, a traffic generator running I/O across a stable/monitored SAN from a generic base host device to target storage device. Here as before, baseline performance measurements may be obtained, error may be injected, and the behavior of the SAN is monitored as it returns/recovers from the error to reach the baseline measurement.

Figure 4B:
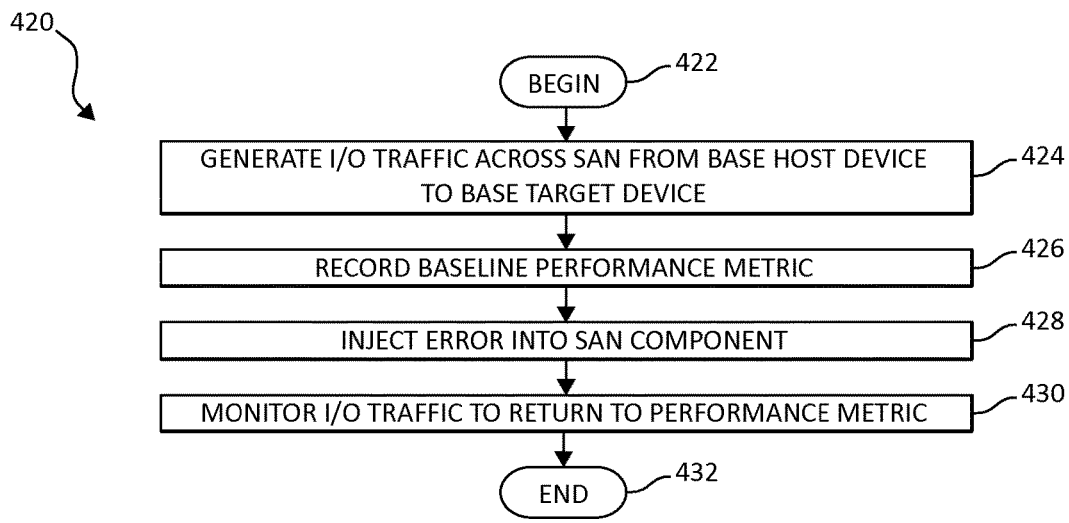
FIG. 4B is an additional flow chart diagram of an additional exemplary method for evaluating error recovery effectiveness in a complex SAN, again in which aspects of the present invention may be implemented.

The illustration in FIG. 4B, following, bears this methodology out, as method 420 begins (step 422), I/O traffic is generated across the SAN from a base host device to a base target device (step 424), baseline performance metric(s) are obtained (step 426), error is injected into a SAN component (step 428), and the I/O traffic is monitored as the error is recovered/baseline performance metric is returned (step 430), and method 420 ends (step 432).

In another embodiment, a SAN qualification methodology may be implemented in much the same manner as FIG. 4B described previously. The SAN devices included in the evaluation may still include, for example, a base host device and base target device. In the instant example, however, the I/O traffic may be ran through various SAN switch(es) being tested/qualified.

In still another embodiment, a mixed component qualification methodology may be implemented. Here, a real host from a particular vendor (i.e., Vendor X) may be evaluated through a stable/monitored SAN to a real storage target from another particular vendor (i.e., Vendor Y). The mixed component qualification methodology may allow, for example, for competitive testing and benchmarking based on real-world error recovery scenarios.

Figure 4C:
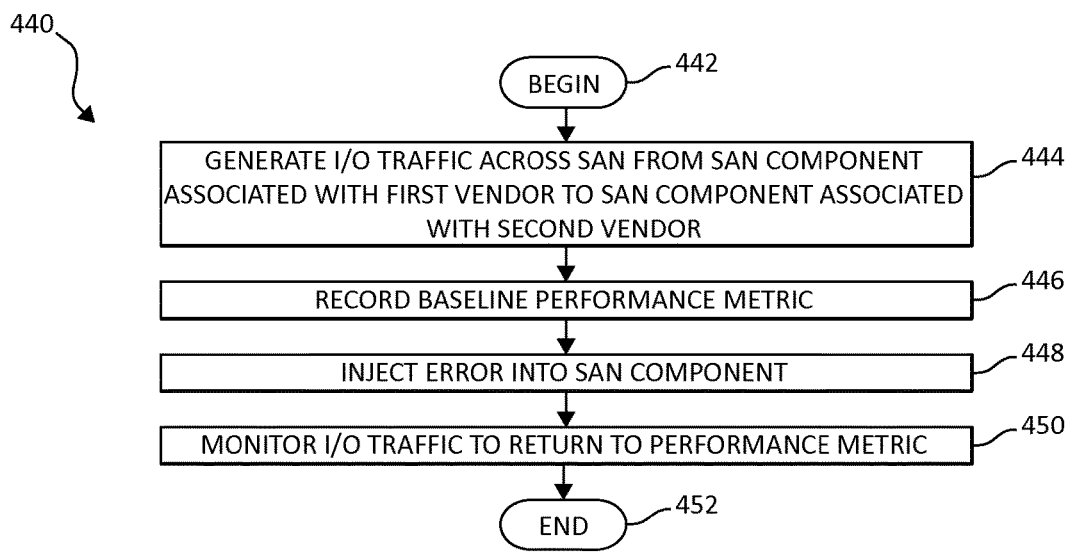
FIG. 4C is an additional flow chart diagram of an additional exemplary method for evaluating error recovery effectiveness in a complex SAN, again in which aspects of the present invention may be implemented.

FIG. 4C bears this methodology out as depicted method 440, which begins (step 442) with the generation of I/O traffic across the SAN from a component associated with a first vendor to another SAN component associated with a second vendor (step 444). Here again, one or more baseline performance metrics are recorded (step 446), error is injected (step 448), and the I/O traffic is monitored to a (stable) return to the baseline performance metric (step 450). The method 440 then ends (step 452).

The various embodiments described above may be achieved, for example, by use of manual performance statistics monitoring and hands on testing procedures. Alternatively, however, the embodiments may also be achieved by adding various components to the SAN, such as software and/or hardware (e.g., monitor probes, analyzers) with various attendant logic to perform the functionality previously described. For example, this software and/or hardware may be configured to, upon a predetermined event, add a performance metric to an existing chart just prior to injecting the error, logging the error time of injection, and then logging the delta time from injection until when performance is determined to have returned to the pre-injection levels and/or SAN stability is reached.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for evaluating error recovery effectiveness in a complex Storage Area Network (SAN) by a processor device, comprising:
   recording at least one baseline performance metric;
   injecting a predetermined error into at least one component of the SAN associated with the recorded baseline performance metric;
   recording an elapsed time from the injection of the error to a return to the recorded baseline performance metric; and
   generating input/output (I/O) traffic from at least one SAN component associated with a first vendor to another at least one SAN component associated with a second vendor.

2. The method of claim 1, further including generating input/output (I/O) traffic across the SAN to a generic base storage device.

3. The method of claim 1, further including generating input/output (I/O) traffic across the SAN from a generic base host device to a generic target storage device.

4. The method of claim 1, further including generating input/output (I/O) traffic across at least one network switch in the SAN, wherein the at least one network switch is under test.

5. The method of claim 1, further including monitoring the recording of the elapsed time to the return of the recorded baseline performance metric, wherein the elapsed time is not calculated until a predetermined stability in the component of the SAN is determined to have returned.

6. The method of claim 1, further including repeating at least one of the recording the baseline metric, injecting the error, and recording the elapsed time for at least one additional component in the SAN according to a predetermined methodology.

7. The method of claim 1, wherein the injecting the predetermined error is performed in conjunction with single or multiple events as a single or multiple occurrence, and further including analyzing specified portions of the complex SAN to determine a rippling distribution resulting from the injection of the predetermined error over the specified portions of the complex SAN.

8. A system for evaluating error recovery effectiveness in a complex Storage Area Network (SAN), comprising:
   a processor device, wherein the processor device:
      records at least one baseline performance metric;
      injects a predetermined error into at least one component of the SAN associated with the recorded baseline performance metric,
      records an elapsed time from the injection of the error to a return to the recorded baseline performance metric, and
      generates input/output (I/O) traffic from at least one SAN component associated with a first vendor to another at least one SAN component associated with a second vendor.

9. The system of claim 8, wherein the processor device generates input/output (I/O) traffic across the SAN to a generic base storage device.

10. The system of claim 8, wherein the processor device generates input/output (I/O) traffic across the SAN from a generic base host device to a generic target storage device.

11. The system of claim 8, wherein the processor device generates input/output (I/O) traffic across at least one network switch in the SAN, wherein the at least one network switch is under test.

12. The system of claim 8, wherein the processor device monitors the recording of the elapsed time to the return of the recorded baseline performance metric, wherein the elapsed time is not calculated until a predetermined stability in the component of the SAN is determined to have returned.

13. The system of claim 8, wherein the processor device repeats at least one of the recording the baseline metric, injecting the error, and recording the elapsed time for at least one additional component in the SAN according to a predetermined methodology.

14. The system of claim 8, wherein the injecting the predetermined error is performed in conjunction with single or multiple events as a single or multiple occurrence, and further wherein the processor device analyzes specified portions of the complex SAN to determine a rippling distribution resulting from the injection of the predetermined error over the specified portions of the complex SAN.

15. A computer program product for evaluating error recovery effectiveness in a complex Storage Area Network (SAN) by a processor device, the computer program product comprising a computer-readable storage medium having computer-readable program code portions stored therein, the computer-readable program code portions comprising:
   a first executable portion that:
      records at least one baseline performance metric;
      injects a predetermined error into at least one component of the SAN associated with the recorded baseline performance metric;
      records an elapsed time from the injection of the error to a return to the recorded baseline performance metric; and
      generates input/output (I/O) traffic from at least one SAN component associated with a first vendor to another at least one SAN component associated with a second vendor.

16. The computer program product of claim 15, further including a second executable portion that generates input/output (I/O) traffic across the SAN to a generic base storage device.

17. The computer program product of claim 15, further including a second executable portion that generates input/output (I/O) traffic across the SAN from a generic base host device to a generic target storage device.

18. The computer program product of claim 15, further including a second executable portion that generates input/output (I/O) traffic across at least one network switch in the SAN, wherein the at least one network switch is under test.

19. The computer program product of claim 15, further including a second executable portion that monitors the recording of the elapsed time to the return of the recorded baseline performance metric, wherein the elapsed time is not calculated until a predetermined stability in the component of the SAN is determined to have returned.

20. The computer program product of claim 15, further including a second executable portion that repeats at least one of the recording the baseline metric, injecting the error, and recording the elapsed time for at least one additional component in the SAN according to a predetermined methodology.

21. The computer program of claim 15, wherein the injecting the predetermined error is performed in conjunction with single or multiple events as a single or multiple occurrence, and further including a second executable portion that analyzes specified portions of the complex SAN to determine a rippling distribution resulting from the injection of the predetermined error over the specified portions of the complex SAN.

* * * * *